(12) United States Patent
Prevost

(10) Patent No.: US 6,239,344 B1
(45) Date of Patent: May 29, 2001

(54) APPARATUS AND METHOD FOR INSTRUCTING THE PLAYING OF NOTES OF A FINGER OPERATED INSTRUMENT

(76) Inventor: Dennis Prevost, 1753 Grand Ave., Unit C, San Diego, CA (US) 92019

( * ) Notice: Subject to any disclaimer, the term of this patent is extended or adjusted under 35 U.S.C. 154(b) by 0 days.

(21) Appl. No.: 09/553,879

(22) Filed: Apr. 20, 2000

(51) Int. Cl.[7] .................................................. G09B 15/02
(52) U.S. Cl. ...................................... 84/471 R; 84/485 R
(58) Field of Search ............................. 84/470 R, 471 R, 84/472, 485 R

(56) References Cited

U.S. PATENT DOCUMENTS

| | | |
|---|---|---|
| D. 327,288 | 6/1992 | Oreo . |
| 1,483,106 * | 2/1924 | Mielke . |
| 1,882,941 | 10/1932 | Rosecrants . |
| 3,131,591 * | 5/1964 | Lawrence . |
| 3,145,481 | 8/1964 | Aldershof . |
| 3,338,126 * | 8/1967 | Wiley, Jr. et al. . |
| 3,700,785 * | 10/1972 | Leonard .............................. 84/470 R |
| 3,785,240 | 1/1974 | Hill . |
| 3,888,155 | 6/1975 | Leonard . |
| 3,903,781 | 9/1975 | Leonard . |
| 3,978,756 | 9/1976 | Feldman . |
| 3,978,757 | 9/1976 | Johnson, Jr. et al. . |
| 4,040,324 | 8/1977 | Green . |
| 4,041,828 | 8/1977 | Leonard . |
| 4,095,506 | 6/1978 | Smith . |
| 4,417,497 | 11/1983 | Nicklaus . |
| 4,464,971 | 8/1984 | Dean . |
| 4,465,282 | 8/1984 | Dillon . |
| 4,503,748 | 3/1985 | Barber, Jr. . |
| 4,559,861 | 12/1985 | Patty et al. . |
| 4,671,159 | 6/1987 | Stark . |
| 4,712,464 | 12/1987 | Nance . |
| 4,763,558 | 8/1988 | Johnson, Jr. . |
| 4,791,848 | 12/1988 | Blum, Jr. . |
| 4,819,539 | 4/1989 | Searing . |
| 4,915,005 | 4/1990 | Schaffer et al. . |
| 5,254,008 | 10/1993 | Dawson . |
| 5,392,682 | 2/1995 | McCartney-Hoy . |
| 5,408,914 | 4/1995 | Breitweiser, Jr. et al. . |
| 5,540,132 | 7/1996 | Hale . |
| 5,594,191 | 1/1997 | Epstein et al. . |
| 5,639,977 | 6/1997 | Hesnan . |
| 5,685,724 | 11/1997 | Bubar . |
| 5,841,051 | 11/1998 | Segan . |
| 5,866,832 * | 2/1999 | Solowiow ......................... 84/485 R |
| 5,920,023 | 7/1999 | Ravagni et al. . |

* cited by examiner

Primary Examiner—Jeffrey Donels
(74) Attorney, Agent, or Firm—Gifford, Krass, Groh, Sprinkle, Anderson & Citkowski, P.C.

(57) ABSTRACT

An apparatus and method for instructing a user in the playing of notes associated with a finger operated instrument such as a guitar. A chart has a length and width and presents a planar display surface subdivided into a plurality of subset display areas. Each of the subset display areas includes a flap secured along a selected edge of the associated subset display area and which is selectively actuated to reveal that subset display area. A first selected number of the subset display areas indicating musical keys and further selected pluralities of the subset display areas indicating chords associated with each of the musical keys, each of the chords further being representative of a finger placement scheme for playing a note associated with the instrument. The student receives musical instruction by selecting a key from the cart, further selecting a first chord associated with that specified key, learning the finger placement associated with the selected chord and proceeding, in a progressive fashion, to select and learn further specified chords associated with additional keys.

10 Claims, 2 Drawing Sheets

APPARATUS AND METHOD FOR INSTRUCTING THE PLAYING OF NOTES OF A FINGER OPERATED INSTRUMENT

BACKGROUND OF THE INVENTION

1. Field of the Invention

The present invention relates generally to systems, apparatuses and methods for the purpose of instructing a student in the playing of an instrument. More particularly, the present invention discloses an apparatus and method for more efficiently and effectively instructing a student in the playing of the notes associated with a finger-operated instrument and so that a more effective grasp of the ability to play the musical instrument is obtained in less time than which is currently possible through more conventional teaching instruction and methodology which have heretofore been employed.

2. Description of the Prior Art

The present invention is well documented with instrument playing instructional guides utilizing finger positioning guides and the like. The general purpose for these, as indicated above, is to assist in instructing the student of the instrument in the proper placement of the fingers in playing the notes associated with the instrument. Such prior art systems and methods of instruction have also been applied in particular to such instruction for stringed instruments such as the guitar.

An example of a prior art finger positioning guides and method for instructing the playing of a stringed instrument is set forth in U.S. Pat. No. 5,920,023, issued to Ravagni et al. which teaches note location and proper finger placement on the fingerboard of the instrument. The device of Ravagni teaches a sheet of an adhesive plastic on which are printed a series of markers indicating note locations, scales or chords. When applied to fretted instruments, the device has fret openings cut therein which are adapted to engage the frets when applied to the instrument. The device is applied to the instrument by inserting it between the strings and the fingerboard, wrapping it around the neck of the instrument and adhering it onto itself along the back of the neck of the instrument.

Another example of a musical teaching device for expediting musical instruction is set forth in U.S. Pat. No. 4,559,861, issued to Patty et al., and which includes a grid of intersecting lines which represent strings and frets of a fingerboard of a stringed instrument. An indicator situated in the vicinity of each intersection represents a musical note and a plurality of movable markers are each capable of being positioned anywhere on the grid and identified by both a particular color and one or more symbols to visually depict a particular aspect of the instrument.

U.S. Pat. No. 3,978,756, issued to Feldman, teaches a guitar instruction system in which note indicia are again emplaced underlying the strings of the guitar along the fingerboard and adjacent to the frets. A musical sheet contains the musical exercise to be practiced and a holder is provided for supporting the music sheet on the fingerboard of the guitar. A mirror is adapted to be positioned in front of the student through which the fingerboard and music sheet can be viewed. The note indicia on the fingerboard of the guitar as well as the musical exercise on the music sheet are written in reverse (left to right) and the area of the fingerboard underlying the respective strings of the guitar and the notes of the musical exercise on the music sheet are color coded so that the musical exercise indicates to the student which string is to be used in producing the required note.

SUMMARY OF THE INVENTION

The present invention is an instructional chart and method of use for assisting a student of a finger operated instrument, most notably a string-operated instrument or guitar, in the playing of notes associated with the instrument. A chart is provided having a length and width and presenting a planar display surface. The chart is subdivided into a plurality of subset display areas, each of these including a covering member which is selectively actuated to reveal the associated subset display area. The covering member in the preferred embodiment is provided as a flap secured along a selected edge of the associated subset display area and which is easily opened and closed to selectively reveal and hide the subset display area.

A first selected number of the subset display areas identify musical keys and further selected pluralities of the subset display areas identify chords associated with each of the musical keys. Each of the chords are representative of a finger placement scheme for playing a note associated with the instrument and it is typically found that first, second and third principal chords and first, second and third relative chords are associated with each key.

The user receives musical instruction by selecting a key, further selecting a first chord associated with that specified key, learning the finger placement associated with the first selected chord, and then proceeding in a progressive fashion to select and learn further specified chords associated with the key in rote memorizing fashion.

The preferred variant of the chart further contemplates a first sheet having imprinted upon a display surface thereof the subset areas corresponding to the keys and associated chords. A second sheet overlays the display surface of the first sheet, the second sheet having a plurality flaps formed therein and which are secured along selected edges to the sheet. The flaps of the second sheet align with the subset display surface areas upon applying the second sheet over the first sheet. The subset display areas associated with the keys and the respective pluralities of chords, in any variant being arranged in either horizontally or vertically extending rows.

The method for instructing a user according to the invention includes the steps of preparing a chart having a length and a width and presenting a planar display surface and subdividing the chart into a plurality of subset display areas which correspond with selected musical keys and pluralities of chords associated with each of the keys. Additional steps includes replaceably covering each of the subset display areas with a flap and the progressive instructional steps of selecting a specified key, selecting a first chord associated with that specified key, learning a finger placement associated with the first selected chord and proceeding in progressive fashion to select and learn further specified chords associated with the keys.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFFERED EMBODIMENT

Referring now to FIGS. 1–4, an instructional chart is illustrated at 10 for assisting a student in the instruction of the correct manner of playing a finger operated instrument (not shown). Most notably, the instrument most usefully employed with the instructional chart and method of instruction is a string-operated instrument and, even more particularly, a guitar. It is however also understood that the instructional chart and method of the invention can be just as easily utilized with a variety of other instruments and it is hereby understood that the present invention contemplates such uses and applications.

The chart 10 is provided having a length and width and presenting a planar display surface. In the further preferred variant, the chart 10 is constructed of a first sheet 12 having thereon a display surface 14, the display surface in turn being subdivided into rows (see at 16, 18, 20 and 22 which illustrates four such horizontally extending rows) of subset areas. Selected ones of the divided and subset areas in identify musical keys. Particular attention is directed to Key of A 24 and Key of B 26 in FIG. 4 and which are associated, respectively, with variations of rows 16' and 18' (and which are illustrated along with variations of rows 20' and 22'). It is also understood that the rows of subdivided areas can extend vertically as well as horizontally.

Figures 1, 2:
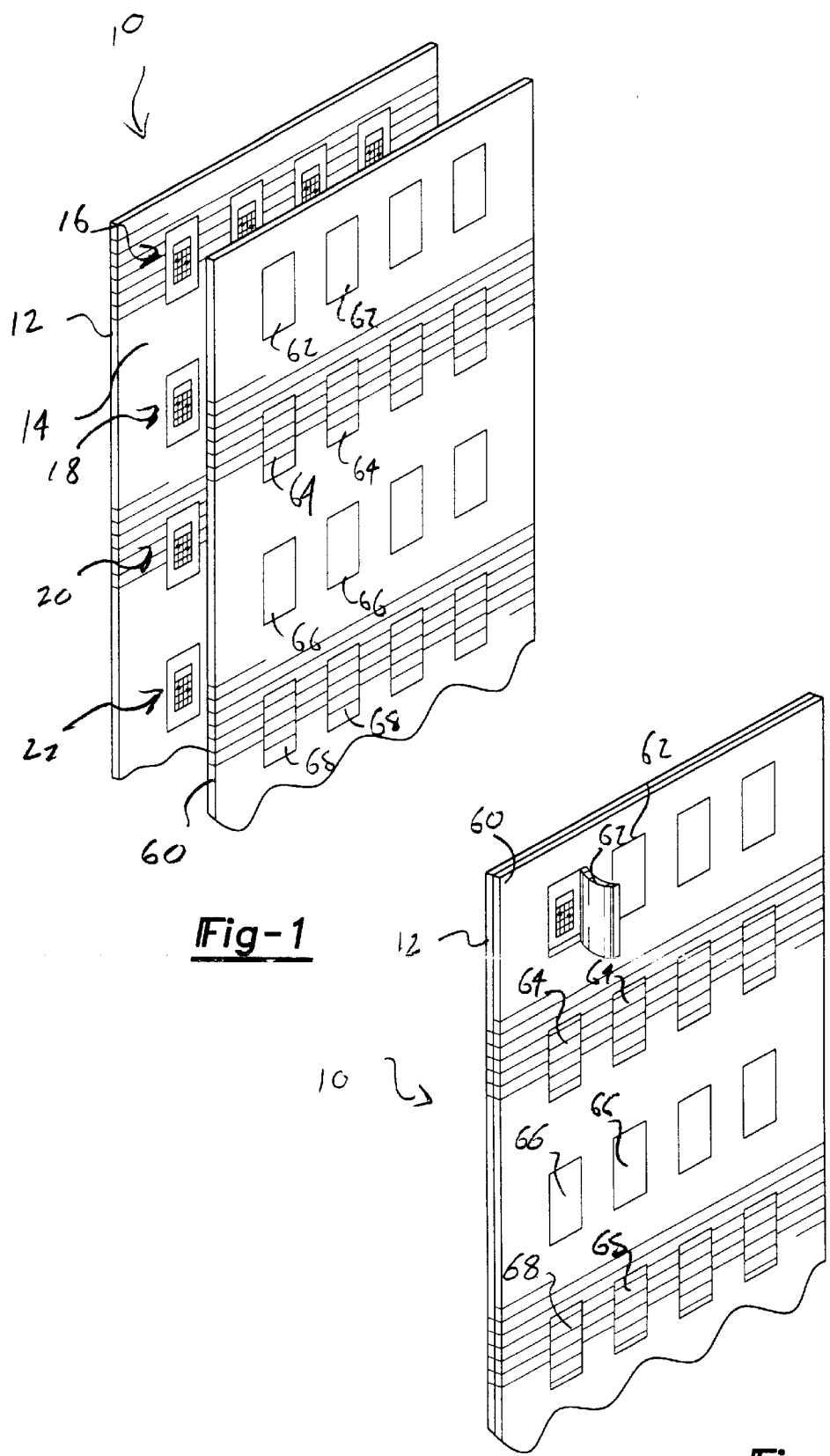
FIG. 1 is a partially exploded view, in perspective, of the instructional chart according to a preferred embodiment of the present invention.
FIG. 2 is a view similar to that shown in FIG. 1 and further illustrating the feature of the openable and reclosable flap incorporated into a secondary or covering sheet and according to the present invention.
Figure 3:
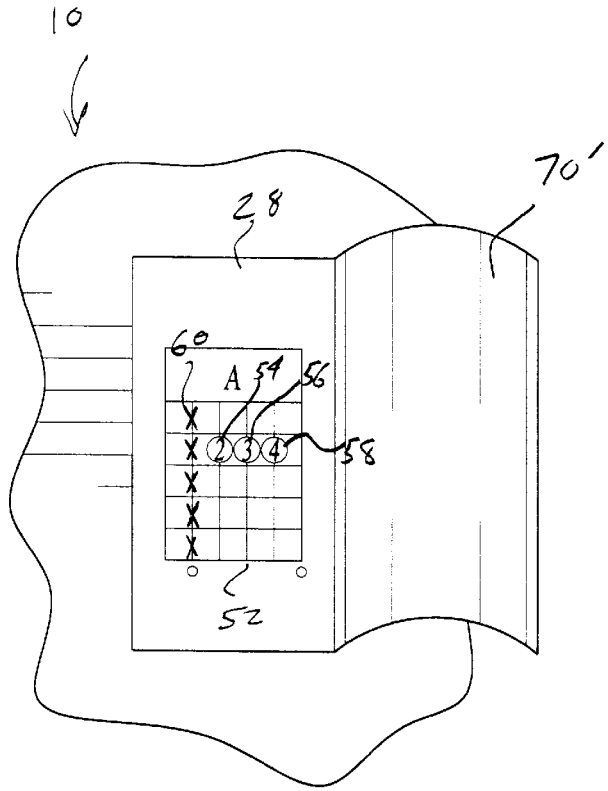
FIG. 3 is an enlarged partial view of a given finger placement scheme associated with a given chord and according to the present invention.
Figure 4:
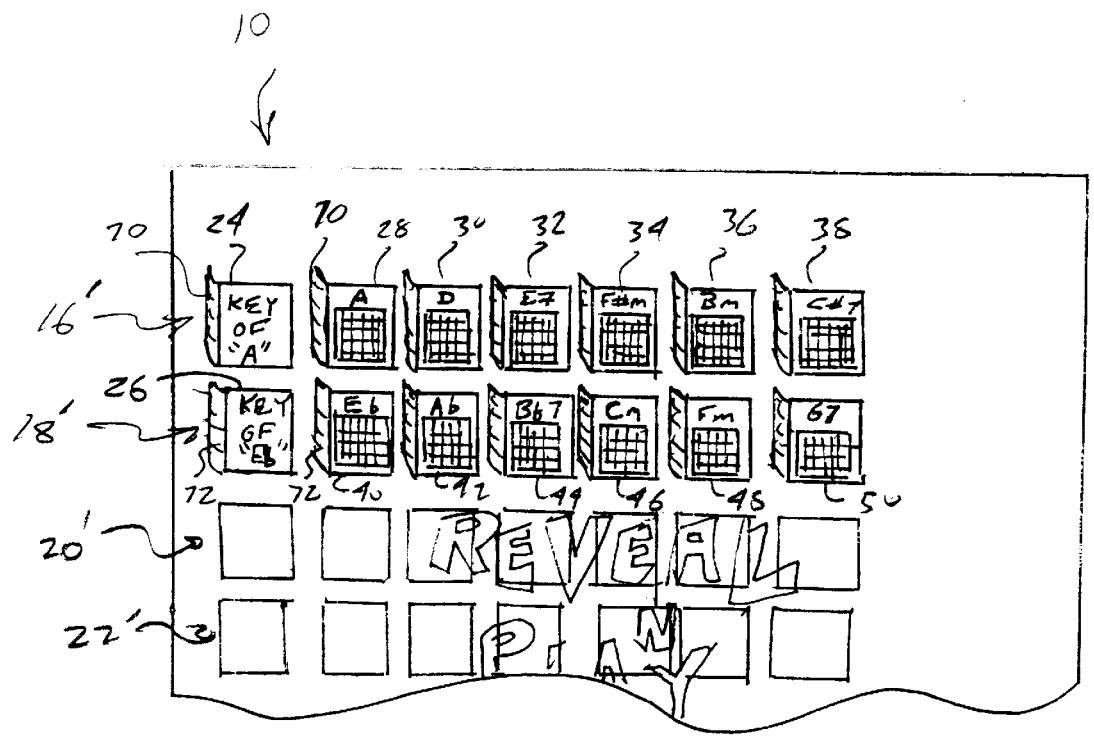
FIG. 4 is a frontal view of a section of the display and instructional chart of the present invention and further illustrating selected rows of musical keys and associated principal and relative chords according to the present invention.

Referring still to FIG. 4, further selected pluralities of the subset display areas identify chords associated with each of the musical keys. In particular, chords 28, 30, 32, 34, 36 and 38 are provided for Key of A 24 and additional chords 40, 42, 44, 46, 48 and 50 are provided for Key of B 26. Referring further to FIG. 3, each of the chords, in this case chord 28 denoting "A", are representative of a finger placement scheme for playing a note associated with the instrument. In FIG. 3, a chord frame or grid 52 is illustrated which identifies the strings associated with the instrument for which instruction is given (this being common for every chord disclosed). Finger placement within the chord frame, such as at 54, 56 and 58 for middle (2), ring (3) and pinkie (4), respectively, are illustrated on the grid 52 and markings 60 further denote a string of the instrument which is not played for the given note. It is typically found that first, second and third principal chords and first, second and third relative chords are associated with each key and it is the mastery of these chords which are essential for correctly learning the appropriate manner for playing the instrument.

Referring again to FIGS. 1 and 2, a second sheet 60 overlays the display surface of the first sheet 12. The second sheet 60 has formed therein pluralities of flaps, such as in rows 62, 64, 66 and 68, which are secured along selected edges to the sheet 60. The rows of flaps 62, 64, 66 and 68 of the second sheet align with the rows of subset display surface areas 16, 18, 20 and 22 (respectively) associated with the key and chords and upon applying the second sheet 60 over the first sheet 12 in an adhesively securable or releasably securable fashion. Along these lines, it is also envisioned that the first and second sheets 12 and 60 may be constructed of magnetically securable materials and so that a given cover (or second) sheet 60 could be used with different underlying (or first) sheets 12 to instruct the playing of different instruments.

The further use of flaps are desired since there are easily opened and closed to selectively reveal and hide the subset display area, such as the given key and associated chords. Referring further to FIG. 4, the manner in which the flaps can be secured to the chart is easily adaptable, with rows of flaps 70 and 72 connected along the left edge of their respective and associated subdivided areas. Referring to FIG. 3, a flap variation 70' differs only in that it is secured along the right corresponding edge of the selected subdivided display area, such as for chord 28.

In use, the user receives musical instruction by selecting a key, further selecting a first chord associated with that specified key and learning the finger placement associated with the first selected chord. The user then proceeds in a progressive fashion to select and learn further specified chords associated with the first selected key, and then additional keys, in rote memorizing fashion.

The method for instructing a user according to the invention is closely based upon the chart as previously described includes the steps of preparing a chart having a length and a width and presenting a planar display surface and subdividing the chart into a plurality of subset display areas which correspond with selected musical keys and pluralities of chords associated with each of the keys. Additional steps includes replaceably covering each of the subset display areas with a flap and the progressive instructional steps of selecting a specified key, selecting a first chord associated with that specified key, learning a finger placement associated with the first selected chord and proceeding in progressive fashion to select and learn further specified chords associated with the keys. Still further steps include again providing the chart as a first sheet imprinted with the subset display areas and a second adhesively securable or releasably securable sheet overlaying the first sheet and having formed therein flaps which align with the keys and chords of the subset display, as well as the arranging of the keys and associated chords in both horizontally and vertically extending rows.

Having described my invention, additional preferred embodiments will become apparent to those skilled in the art to which it pertains and without deviating from the scope of the appended claims.

I claim:

1. An apparatus for instructing a user in the playing of notes associated with a finger operated instrument, comprising:

a chart having a length and width and presenting a planar display surface;

said chart being subdivided into a plurality of subset display areas, each of said subset display areas including a covering means which is selectively actuated to reveal said associated subset display area, said covering means further comprising a flap secured along a selected edge of said associated subset display area;

a first selected number of said subset display areas comprising musical keys; and further selected pluralities of said subset display areas comprising chords associated with each of said musical keys, each of said further selected pluralities of said subset display areas further comprising first, second and third principal chords and first, second and third relative chords, each of said chords being representative of a finger placement scheme for playing a note associated with the instrument;

the user receiving musical instruction by selecting a key, further selecting a first chord associated with said specified key, learning the finger placement associated with said first selected chord, and proceeding in a progressive fashion to select and learn said further specified chords associated with said key.

2. The apparatus as described in claim 1, said chart further comprising a first sheet having imprinted upon a display surface thereof said subset areas corresponding to said keys and said associated chords, said chart further comprising a second sheet overlaying said display surface of said first sheet, said second sheet having a plurality flaps formed therein which are secured along selected edges to said sheet, said flaps aligning with said subset display surface areas upon applying said second sheet over said first sheet.

3. The apparatus as described in claim 1, further comprising said subset display areas associated with said keys and said respective pluralities of chords being arranged in horizontally extending rows.

4. The apparatus as described in claim 1, further comprising said subset display areas associated with said keys and said respective pluralities of chords being arranged in vertically extending rows.

5. A method for instructing a user in the playing of notes associated with a finger operated instrument, said method comprising the steps of:

preparing a chart having a length and a width and presenting a planar display surface;

subdividing said chart into a plurality of subset display areas which correspond with selected musical keys and pluralities of chords associated with each of said keys;

replaceably covering each of said subset display areas, said step of replaceably covering each of said subset display areas further comprising providing a flap secured along a selected edge of said associated display area;

selecting a specified key;

selecting a first chord associated with said specified key;

learning a finger placement associated with said first selected chord;

selecting first, second and third principal chords and first, second and third relative chords for a specified key; and proceeding in progressive fashion to select and learn said further specified chords associated with said specified key.

6. The method for instructing a user as described in claim 5, further comprising the steps of providing said chart with a first sheet, imprinting on said first sheet said subset display areas, providing a second sheet overlaying said first sheet, said step of replaceably covering said subset display areas additionally comprising providing flaps secured along selected edges of said associated display areas.

7. The method for instructing a user as described in claim 5, further comprising the step of arranging said keys and said respective pluralities of chords in horizontally extending rows.

8. The method for instructing a user as described in claim 5, further comprising the step of arranging said keys and said respective pluralities of chords in vertically extending rows.

9. An apparatus for instructing a user in the playing of notes associated with a finger operated instrument, comprising:

a chart having a length and width and presenting a planar display surface;

said chart being subdivided into a plurality of subset display areas, each of said subset display areas including a covering means which is selectively actuated to reveal said associated subset display;

a first selected number of said subset display areas comprising musical keys;

further selected pluralities of said subset display areas comprising chords associated with each of said musical keys, each of said chords being representative of a finger placement scheme for playing a note associated with the instrument; and said chart further comprising a first sheet having imprinted upon a display surface thereof, said subset areas corresponding to said keys and said associated chords, said chart further comprising a second sheet overlaying said display surface of said first sheet, said second sheet having a plurality flaps formed therein which are secured along selected edges to said sheet, said flaps aligning with said subset display surface areas upon applying said second sheet over said first sheet;

the user receiving musical instruction by selecting a key, further selecting a first chord associated with said specified key, learning the finger placement associated with said first selected chord, and proceeding in a progressive fashion to select and learn said further specified chords associated with said key in rote memorizing fashion.

10. A method for instructing a user in the playing of notes associated with a finger operated instrument, said method comprising the steps of:

preparing a chart having a length and a width and presenting a planar display surface;

subdividing said chart into a plurality of subset display areas which correspond with selected musical keys and pluralities of chords associated with each of said keys;

providing said chart with a first sheet, imprinting on said first sheet said subset display areas, providing a second sheet overlaying said first sheet;

replaceably covering each of said subset display areas, said step of replaceably covering said subset display areas additionally comprising providing flaps secured along selected edges of said associated display areas;

selecting a specified key;

selecting a first chord associated with said specified key;

learning a finger placement associated with said first selected chord; and proceeding in progressive fashion to select and learn further specified chords associated with said specified key in rote memorizing fashion.

* * * * *